(12) United States Patent  
Scott

(10) Patent No.: US 7,559,305 B1
(45) Date of Patent: Jul. 14, 2009

(54) AIR INTAKE SYSTEM

(76) Inventor: David Scott, 12509 Morgan Rd., Hudson, FL (US) 34669

(*) Notice: Subject to any disclaimer, the term of this patent is extended or adjusted under 35 U.S.C. 154(b) by 0 days.

(21) Appl. No.: 11/649,189

(22) Filed: Jan. 3, 2007

Related U.S. Application Data

(63) Continuation-in-part of application No. 10/903,392, filed on Jul. 30, 2004, now Pat. No. 7,237,768.

(51) Int. Cl.
F02M 35/10 (2006.01)
(52) U.S. Cl. ............... 123/184.51; 123/184.47; 123/184.53
(58) Field of Classification Search .................. 123/184.34–184.36, 184.42, 184.43, 184.44, 123/184.47, 184.48, 184.49, 184.51, 184.53

See application file for complete search history.

(56) References Cited

U.S. PATENT DOCUMENTS 6,192,850 B1 * 2/2001 Rutschmann et al. .. 123/184.57

FOREIGN PATENT DOCUMENTS

JP 1-110847 * 4/1989

* cited by examiner

Primary Examiner—Noah Kamen
(74) Attorney, Agent, or Firm—Edward P. Dutkiewicz

(57) ABSTRACT

An intake plenum has a bottom and a continuous side wall. The plenum has at least one tube opening there into. There is at least one intake tube, with each tube having an inflow end and an outflow end. Each inflow end is coupled to a plenum tube opening. There is a plenum airflow regulator housed within the plenum. There is at least one fuel injector.

15 Claims, 4 Drawing Sheets

AIR INTAKE SYSTEM

CLAIM OF PRIORITY

The present application is a continuation-in-part of a patent application, bearing Ser. No. 10/903,392 filed on Jul. 30, 2004 now U.S. Pat. No. 7,237,768. The parent application is and the present application claims the priority of the above described prior parent application.

BACKGROUND OF THE INVENTION

1. Field of the Invention

The present invention relates to a Air Intake System and more particularly pertains to a device to increase engine efficiency.

2. Description of the Prior Art

The use of other devices to direct air into an internal combustion engine is known in the prior art. More specifically, other devices to direct air into an internal combustion engine previously devised and utilized for the purpose of increasing engine efficiency are known to consist basically of familiar, expected, and obvious structural configurations, notwithstanding the myriad of designs encompassed by the crowded prior art which has been developed for the fulfillment of countless objectives and requirements.

While the devices described in the prior art fulfill their respective, particular objectives and requirements, the prior art does not describe Air Intake System that allows a device to increase engine efficiency.

In this respect, the Air Intake System according to the present invention substantially departs from the conventional concepts and designs of the prior art, and in doing so provides an apparatus primarily developed for the purpose of a device to increase engine efficiency.

Therefore, it can be appreciated that there exists a continuing need for a new and improved Air Intake System which can be used for a device to increase engine efficiency. In this regard, the present invention substantially fulfills this need.

SUMMARY OF THE INVENTION

In view of the foregoing disadvantages inherent in the known types of other devices to direct air into an internal combustion engine now present in the prior art, the present invention provides an improved Air Intake System. As such, the general purpose of the present invention, which will be described subsequently in greater detail, is to provide a new and improved Air Intake System and method which has all the advantages of the prior art and none of the disadvantages.

To attain this, the present invention essentially comprises an air intake system, comprising several components, in combination.

First provided is an intake plenum. The plenum is fabricated of a rigid material. The plenum has an upper, superior portion and a lower, inferior portion. The plenum has a generally round cylindrical tubular configuration. The plenum has a bottom and a continuous side wall. The bottom of the lower portion of the plenum has a lower surface and an upper surface with a thickness there between. The bottom of the lower portion of the plenum has a tension shaft coupled there to. The side wall of the plenum has an inner surface and an outer surface with a thickness there between. The plenum has at least one tube opening there into. The tube opening has an associated coupling means.

Next provided is at least one intake tube. The intake tube is fabricated of a rigid material. The intake tube has a generally round tubular hollow configuration, with the tube having a smooth inner tube wall. In a configuration where there is more than one tube, each tube has an equal length in that the length variance between the tube lengths is between about 0.001 inch and 1.00 inch.

The tube has an inflow end and an outflow end. Each inflow end has a coupling means configured to mate with and be received by the coupling means of the tube opening of the plenum, so as to allow the intake tube to be coupled to a plenum tube opening. The outflow end of the tube having an coupling means. The tube has a fuel injection port. The fuel injection port is located within one-third of the length of the tube from the outflow end of the tube. This positioning places the fuel injection port near the outflow end of the tube. In an application of the present system with an internal combustion engine, such as a gasoline engine, the fuel injection port would be in a position near to the intake valve, giving the fuel less time to contact the side wall and condense from the vapor to the liquid state.

Next provided is a plenum airflow regulator. The plenum airflow regulator has a generally hemispherical configuration. The airflow regulator has a rounded superior, top surface and a flat inferior, bottom surface, and may be said to have a mushroom-shaped appearance. The airflow regulator is positioned within the plenum with the superior, top surface of the regulator being located closer to the upper plenum than the bottom surface of the regulator. The inferior, bottom surface of the airflow regulator is located closer to the bottom of the plenum than is the top surface of the regulator. The rounded superior top surface of the airflow regulator is configured and sized to mate with and substantially occlude the lower portion of the plenum. Substantially occlusion is the occlusion of between about sixty percent of the cross sectional area of the plenum and ninety nine percent of the cross sectional area of the plenum. In this configuration the occlusion is such that there is a constant vacuum within the plenum. As the engine increases revolutions per minute the vacuum increases, pulling the regulator downward and therefore opening up the plenum. The constant vacuum, even when idling, creates a more rapid response for improved acceleration. The airflow regulator is contained within an area near the bottom of the plenum. The inferior bottom surface of the airflow regulator has an associated spring tension shaft protruding there from, and an associated coiled spring. The coiled spring has a plurality of coils, and the spring is positioned so that the tension shaft passes through all the coils of the spring. The tension shaft is coupled to the lower portion of the plenum. The spring is contained between the inferior surface of the airflow regulator and the inner bottom surface of the plenum and is configured to provide a constant or continuous vacuum between the plenum and the intake ports of the internal combustion engine. In this configuration the spring biases the air flow regulator in a direction so as to maintain the position of the air flow regulator with the interior of the wall of the plenum so as to maintain a vacuum therein.

Next provided is at least one fuel injector. The fuel injector is coupled to the fuel injection port of the intake tube. The fuel injector has an associated fuel supply line coupled there to and the fuel injector has a control means coupled there to. The fuel injector control means may be a wire carrying an electrical impulse such as a voltage or a current. The means may be an electro-magnetic impulse or wave. The means may also be a radio frequency or light beam that triggers or controls the fuel injector. The means may also be a mechanical coupling that allows a user to control the amount of fuel the injector dispenses into the tube. The fuel injector is positioned to be within one third the length of the tube from the output end of the tube. This provides a short distance between fuel input and fuel intake into the engine valves and cylinders. The proximity to the end of the tube minimizes the distance, and hence the time, the fuel has to condense out of vapor. This allows move vaporized fuel to be taken in by the engine, and therefore provides for better fuel efficiency, providing an increase in gas mileage, and a decrease in pollutants.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Air Intake System which has all of the advantages of the prior art other devices to direct air into an internal combustion engine and none of the disadvantages.

It is another object of the present invention to provide a new and improved Air Intake System which may be easily and efficiently manufactured and marketed.

It is further object of the present invention to provide a new and improved Air Intake System which is of durable and reliable constructions.

An even further object of the present invention is to provide a new and improved Air Intake System which is susceptible of a low cost of manufacture with regard to both materials and labor, and which accordingly is then susceptible of low prices of sale to the consuming public, thereby making such Air Intake System economically available to the buying public.

Even still another object of the present invention is to provide a Air Intake System for a device to increase engine efficiency.

Lastly, it is an object of the present invention to provide a new and improved air intake system. An intake plenum has a bottom and a continuous side wall. The plenum has at least one tube opening there into. There is at least one intake tube, with each tube having an inflow end and an outflow end. Each inflow end is coupled to a plenum tube opening. There is a plenum airflow regulator housed within the plenum. There is at least one fuel injector.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
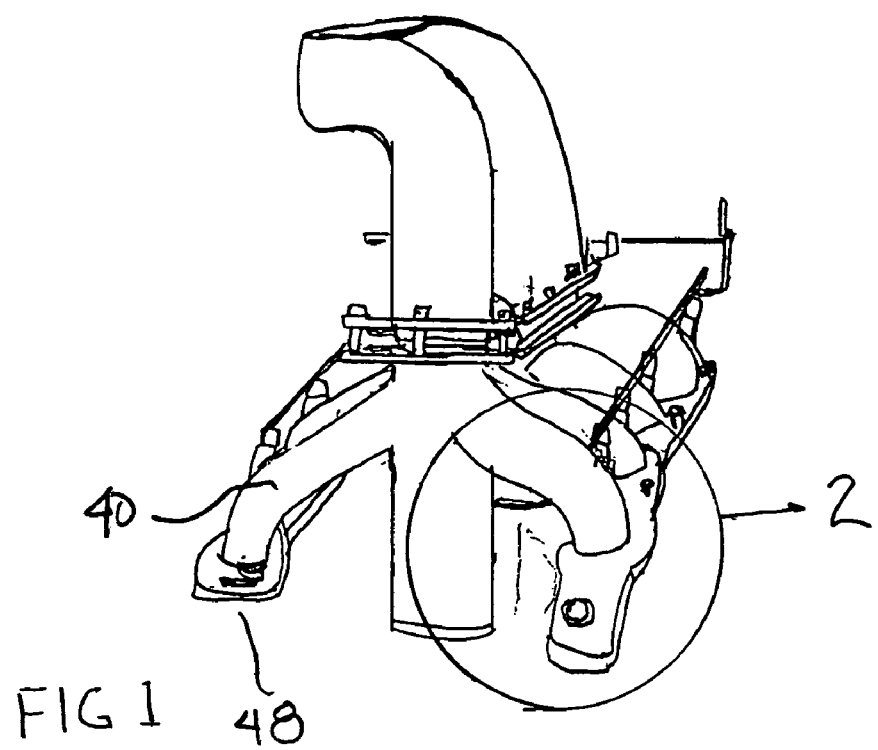
FIG. 1 is a perspective view of the device.
Figure 2:
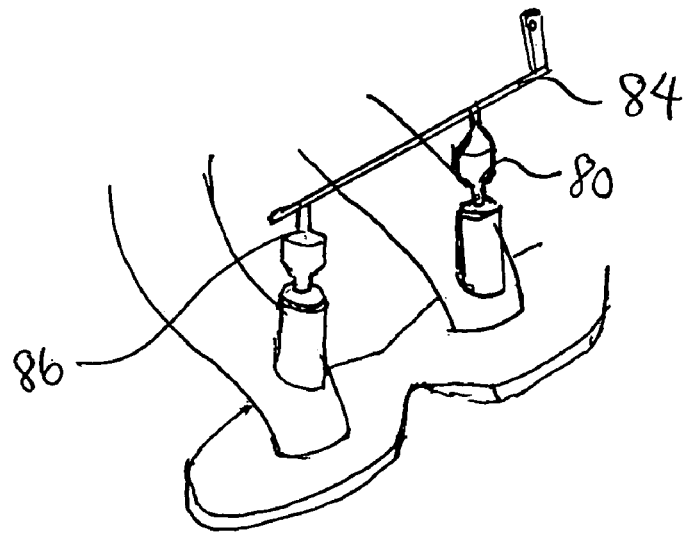
FIG. 2 is a close up of the device taken at circle 2 of FIG. 1.
Figure 3:
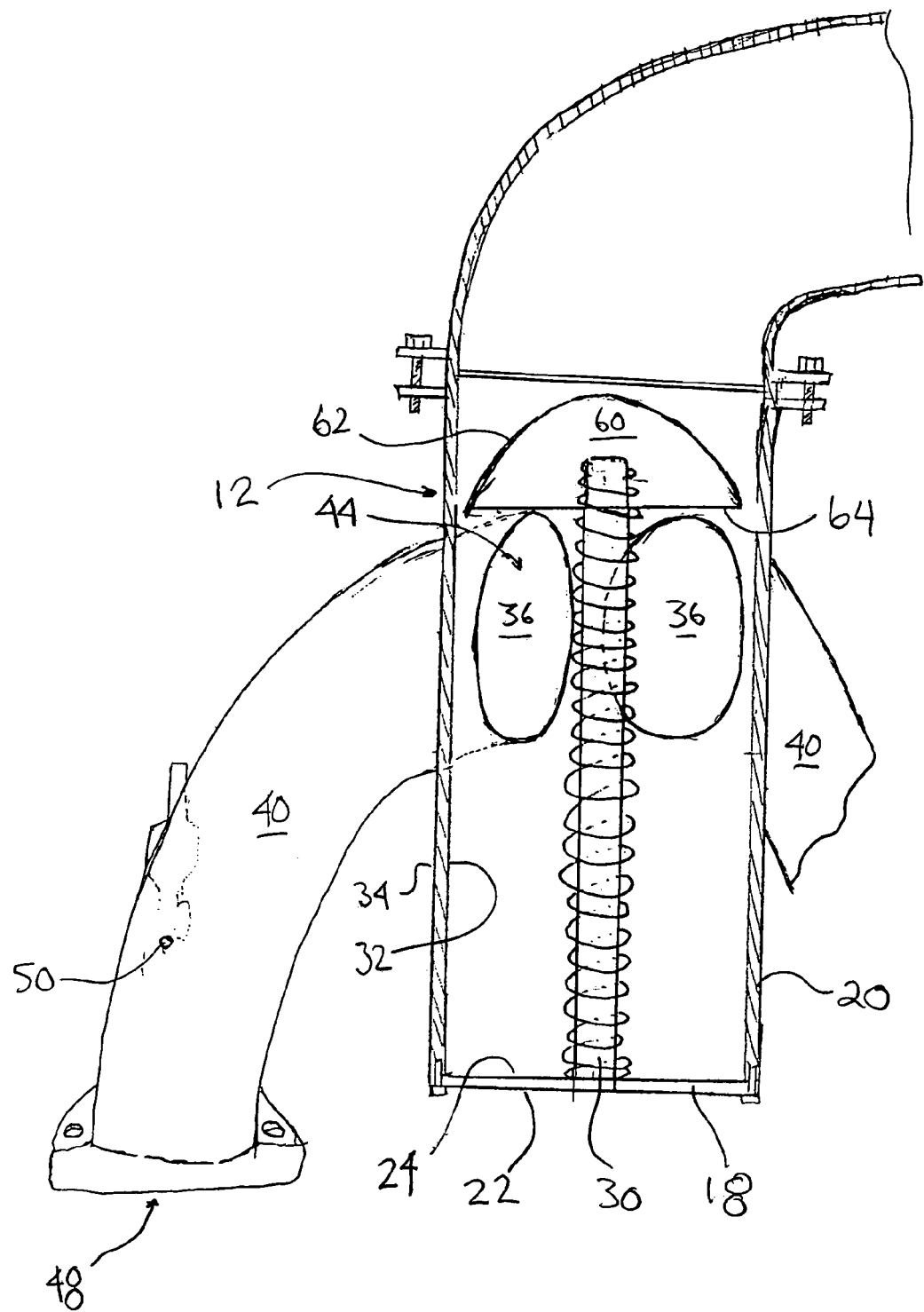
FIG. 3 is cross sectional view of the plenum, demonstrating the relationship of the airflow regulator with the plenum and plenum bottom.
Figure 4:
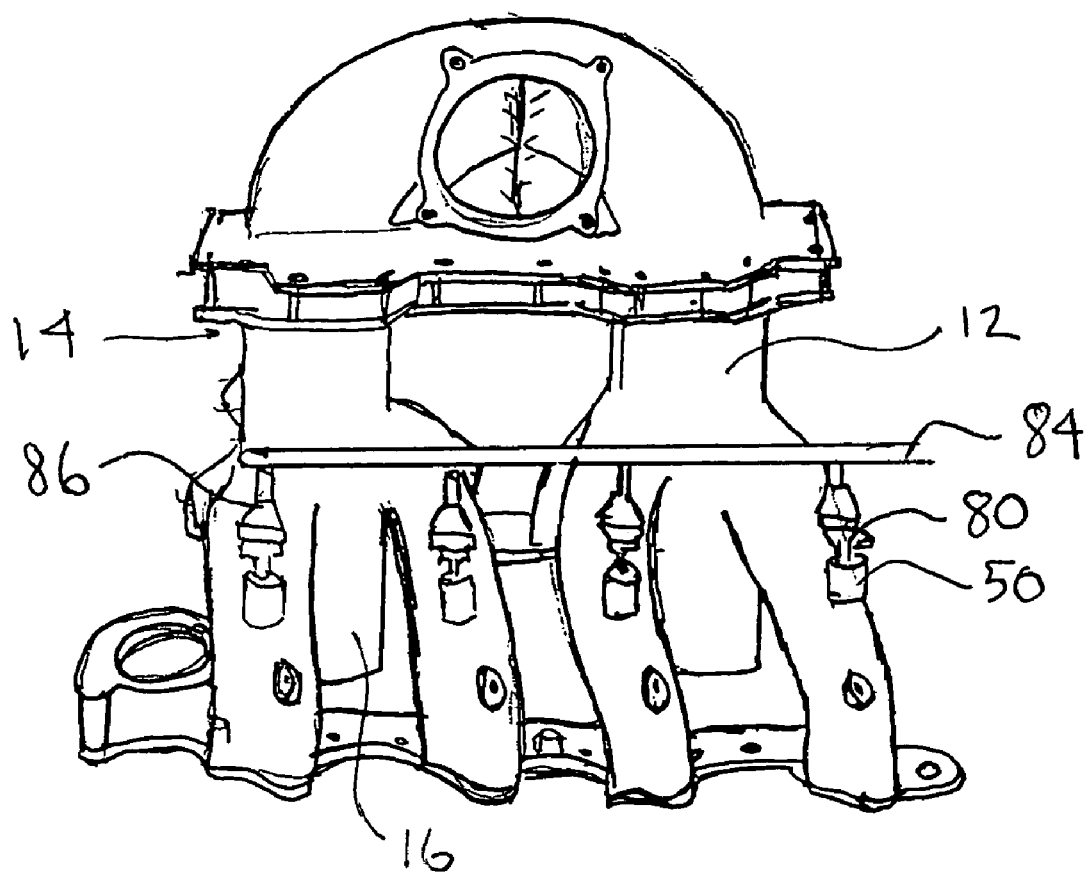
FIG. 4 is side view of the device, showing the intake of the plenums.
Figure 5:
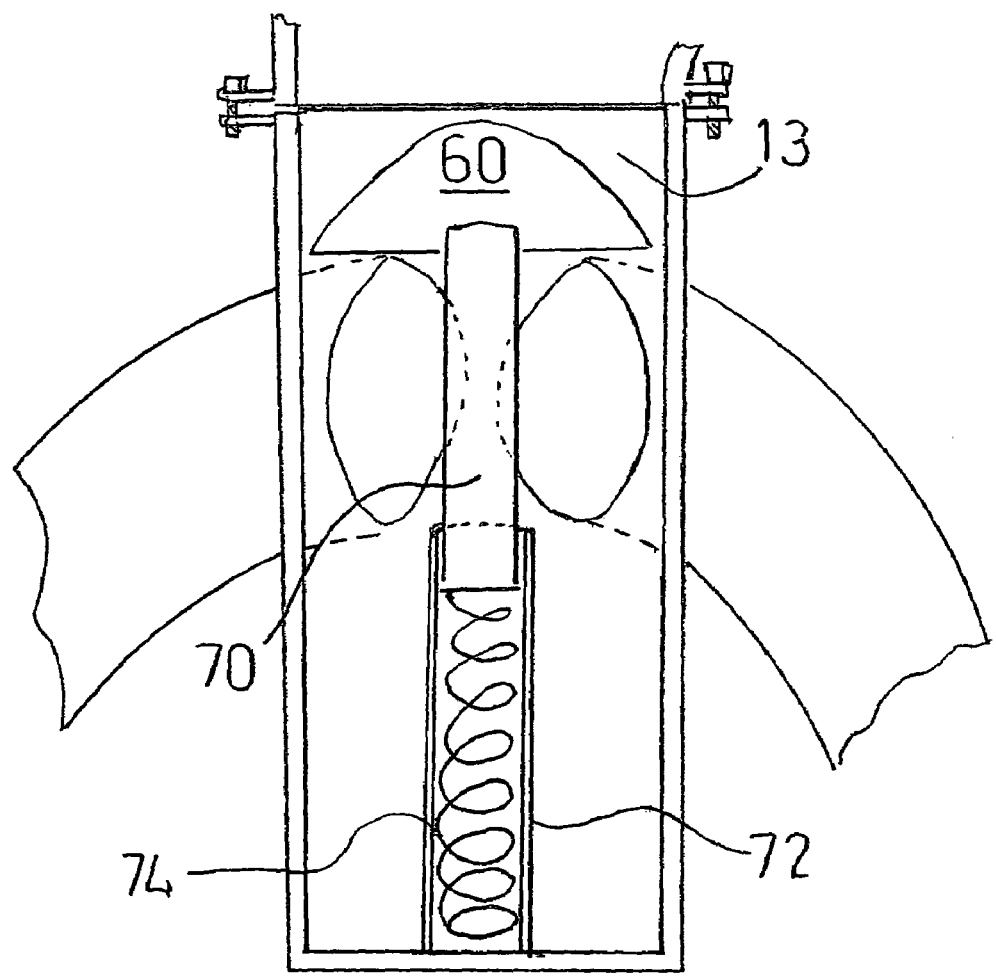
FIG. 5 is a cross sectional view of the alternate embodiment in which the tension shaft is a telescoping shaft, having the spring contained within the shaft.

With reference now to the drawings, and in particular to FIG. 1 thereof, the preferred embodiment of the new and improved Air Intake System embodying the principles and concepts of the present invention and generally designated by the reference numeral 10 will be described.

The present invention, the Air Intake System 10 is comprised of a plurality of components. Such components in their broadest context include a plenum, an air regulator, at least one tube and a fuel injector. Such components are individually configured and correlated with respect to each other so as to attain the desired objective.

An air intake system, comprising several components, in combination.

First provided is an intake plenum 12. The plenum is fabricated of a rigid material. The plenum has an upper, superior portion 14 and a lower, inferior portion 16. The plenum has a generally round cylindrical tubular configuration forming an air Passageway 13 therein. The plenum has a bottom and a continuous side wall. The bottom of the lower portion of the plenum has a lower surface and an upper surface with a thickness there between.

The bottom of the lower portion of the plenum has a tension shaft 30 coupled there to. The side wall of the plenum has an inner surface 32 and an outer surface 34 with a thickness there between. The plenum has at least one tube opening 36 there into. The tube opening has an associated coupling means. A coupling means may be a weldment, a thread, a press fit, or a gasket.

Next provided is at least one intake tube 40. The intake tube is fabricated of a rigid material. The intake tube has a generally round tubular hollow configuration, with the tube having a smooth inner tube wall. In a configuration where there is more than one tube, each tube has an equal length in that the length variance between the tube lengths is between about 0.001 inch and 1.00 inch.

The tube has an inflow end 44 and an outflow end 48. Each inflow end has a coupling means configured to mate with and be received by the coupling means of the tube opening of the plenum, so as to allow the intake tube to be coupled to a plenum tube opening. The outflow end of the tube having an coupling means. The coupling means may be a weldment, a fitting, a thread, a gasket and bolts. The tube has a fuel injection port 50.

The fuel injection port is located within one-third of the length of the tube from the outflow end of the tube. This positioning places the fuel injection port near the outflow end of the tube. In an application of the present system with an internal combustion engine, such as a gasoline engine, the fuel injection port would be in a position near to the intake valve, giving the fuel less time to contact the side wall and condense from the vapor to the liquid state.

Next provided is a plenum airflow regulator 60. The plenum airflow regulator has a generally hemispherical configuration. The airflow regulator has a rounded superior, top surface 62 and a flat inferior, bottom surface 64, and may be said to have a mushroom-shaped appearance.

The airflow regulator is positioned within the plenum with the superior, top surface of the regulator being located closer to the upper plenum than the bottom surface of the regulator. The inferior, bottom surface of the airflow regulator is located closer to the bottom of the plenum than is the top surface of the regulator. The rounded superior top surface of the airflow regulator is configured and sized to mate with and substantially occlude the lower portion of the plenum. Substantially occlusion is the occlusion of between about sixty percent of the cross sectional area of the plenum and ninety nine and one half percent of the cross sectional area of the plenum. The airflow regulator is configured to be slidably mounted on the tension shaft, so that the regulator can travel within the plenum thereby varying the amount of opening of the plenum for air movement.

In this configuration the occlusion is such that there is a constant vacuum within the plenum. By constant vacuum it is meant that there is a presence of a vacuum, or negative pressure within the plenum below the airflow regulator. The amount of vacuum is not constant, but the presence of vacuum is constant.

As the engine increases revolutions per minute the vacuum increases, pulling the increasing the negative pressure below the airflow regulator and causing the airflow regulator to move downward in response to the increase in vacuum, and therefore opening up the plenum. The constant vacuum, even when idling, creates a more rapid response for improved acceleration and engine efficiency. The airflow regulator is contained within an area from just above the air intake tube openings to an area below, or near below the air intake tube openings of the plenum.

The inferior bottom surface of the airflow regulator has an associated spring tension shaft protruding there from, and an associated coiled spring. The coiled spring has a plurality of coils, and the spring is positioned so that the tension shaft passes through all the coils of the spring. The tension shaft is coupled to the lower portion of the plenum.

The spring has a predetermined constant, or K value, and the spring is contained between the inferior, or bottom, surface of the airflow regulator and the inner bottom surface of the plenum and is configured to provide a constant or continuous vacuum between the plenum and the intake ports of the internal combustion engine. In this configuration the spring biases the air flow regulator in an upward direction. The airflow regulator position acts to occlude the plenum and therefore maintain a vacuum within the tubes between the plenum and engine. As the vacuum builds beneath the airflow regulator, the vacuum works against the spring constant and moves the airflow regulator downward on the tension shaft.

In another embodiment the tension shaft may comprise two hollow telescoping shafts, with the spring contained within the hollow telescoping shafts. The airflow regulator is coupled to the upper shaft 70 and the lower shaft 72 is coupled to the floor of the plenum. The spring 74 is contained within and between the two hollow, tubular shafts and biases the airflow regulator in the upward position.

Next provided is at least one fuel injector 80. The fuel injector is coupled to the fuel injection port 82 of the intake tube. The fuel injector has an associated fuel supply line 84 coupled there to and the fuel injector has a control means 86 coupled there to. The fuel injector control means may be a wire carrying an electrical impulse such as a voltage or a current. The means may be an electro-magnetic impulse or wave. The means may also be a radio frequency or light beam that triggers or controls the fuel injector. The means may also be a mechanical coupling that allows a user to control the amount of fuel the injector dispenses into the tube.

The fuel injector is positioned to be within one third the length of the tube from the output end of the tube. This provides a short distance between fuel input and fuel intake into the engine valves and cylinders. The proximity to the end of the tube minimizes the distance, and hence the time, the fuel has to condense out of vapor. This allows move vaporized fuel to be taken in by the engine, and therefore provides for better fuel efficiency, providing an increase in gas mileage, and a decrease in pollutants.

One skilled in the art would recognize that the present Air Intake System is configured to be used in conjunction with an internal combustion engine, such as a gasoline engine. Alternative fuels, such as methanol and ethanol may also be used to power the internal combustion engine. Such fuels also employ an air-fuel mixing before the mixture is directed into the combustion chamber of the engine.

In use the Air Intake System is coupled with an engine head, having an intake valve (head and valve not shown, but common and well known in the art). The system, as described, by utilizing a constant presence of a vacuum of varying magnitude, moves air quickly to the intake valve of the engine. By placing the fuel injection port near the valve, the amount of fuel condensation, and hence, surface wetting of the intake tube, is minimized. This means more fuel arrives at the intake valve in the vaporized state.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An air intake system, comprising:
   an intake plenum having a bottom and a continuous side wall, the plenum having at least one tube opening there into, the plenum comprising an air passageway;

at least one intake tube, each tube having an inflow end and an outflow end, each inflow end coupled to a plenum tube opening;

a slidably mounted plenum airflow regulator having an associated biasing spring housed within the plenum the spring biasing the regulator in a substantially air passageway occluding position;

at least one fuel injector coupled to an intake tube.

2. The air intake system described in claim 1 wherein each tube opening has an associated coupling means for coupling the tube to the plenum.

3. The air intake system described in claim 1 wherein the plenum is fabricated of a rigid material and each intake tube is fabricated of a rigid material, each tube having a generally round tubular hollow configuration, with each tube having a smooth inner tube wall.

4. The air intake system described in claim 3 wherein each tube has a length of between about 2 and 24 inches.

5. The air intake system described in claim 4 with each tube having a length variance of between about 0.001 inch and 1.00 inch.

6. The air intake system described in claim 1 wherein the outflow end of each tube has an coupling means, each tube having a fuel injection port.

7. The air intake system described in claim 6 wherein with the fuel-injection port is located within one-third of the length of the tube from the outflow end of the tube.

8. The air intake system described in claim 1 wherein the plenum is fabricated of a rigid material having an upper superior portion and a lower inferior portion, the upper superior portion of the plenum having a generally round cylindrical tubular configuration having an inside wall and an outside wall and a thickness there between, with the bottom of the lower inferior portion of the plenum having a lower surface and an upper surface with a thickness there between, wherein the bottom of the plenum has a tension shaft aperture there through.

9. The air intake system described in claim 8 wherein the plenum tension shaft has an associated biasing spring coupled there to.

10. The air intake system described in claim 1 wherein the airflow regulator has a hemispherical superior top surface and a flat bottom surface.

11. The air intake system described in claim 10 wherein the airflow regulator is configured and sized to mate with and occlude the lower portion of the plenum.

12. The air intake system described in claim 1 wherein the bottom surface of the airflow regulator has an associated spring tension shaft and an associated coiled spring.

13. The air intake system described in claim 12 wherein the spring has a plurality of coils and the spring is positioned so that the tension shaft passes through all the coils of the spring, with the tension shaft being coupled to the bottom of the plenum, with the spring being contained between the airflow regulator and the bottom of the plenum, the tension shaft also passing through a tension shaft aperture located in the bottom of the plenum, with the spring being contained between the airflow regulator and the bottom of the plenum.

14. The air intake system described in claim 1 wherein a fuel injector is coupled to the fuel injection port of each intake tube, each fuel injector having an associated fuel supply line coupled there to and each fuel injector having a control means coupled there to.

15. An air intake system, comprising:

an intake plenum fabricated of a rigid material having an upper superior portion and a lower inferior portion, the plenum having a generally round cylindrical tubular configuration forming an air Passageway therein, with the plenum having a bottom and a continuous side wall, the bottom of the lower portion of the plenum having a lower surface and an upper surface with a thickness there between, the bottom of the lower portion of the plenum having a tension shaft aperture there through, the side wall of the plenum having an inner surface and an outer surface with a thickness there between, the plenum side wall having a plurality of tube openings there into, the tube openings having an associated coupling means;

a plurality of intake tubes fabricated of a rigid material, each intake tube having a generally round tubular hollow configuration, with each tube having a smooth inner tube wall, with each tube having an equal length and within a length variance of between about 0.001 inch and 1.00 inch, each tube having an inflow end and an outflow end, each inflow end having a coupling means so as to allow the intake end of each tube to be coupled to a plenum side wall tube opening, the outflow end of each tube having an coupling means, each tube having a fuel injection port, with the port being located within one-third of the length of the tube from the outflow end of the tube;

a plenum airflow regulator having a generally hemispherical configuration having a rounded superior top surface and a flat inferior bottom surface, the rounded superior top surface of the airflow regulator being configured and sized to mate with and to substantially occlude the lower portion of the plenum, the inferior bottom surface of the airflow regulator having an associated spring tension shaft and an associated coiled spring, with the spring having a plurality of coils and the spring being positioned so that the tension shaft passes through all the coils of the spring, with the tension shaft being coupled to the lower portion of the plenum, with the tension shaft also passing through the tension shaft aperture of the lower portion of the plenum, with the spring being contained between the inferior surface of the airflow regulator and the inner bottom surface of the plenum;

a plurality of fuel injectors with a fuel injector being coupled to the fuel injection port of each of the intake tubes, each fuel injector having an associated fuel supply line coupled there to and each fuel injector having a control means coupled there to.

* * * * *